Feb. 19, 1957 F. P. BENNETT 2,781,736
INDICATING MEANS
Filed June 7, 1955 3 Sheets-Sheet 1

INVENTOR.
Frank P. Bennett,
BY
Robert R. Lockwood
Atty.

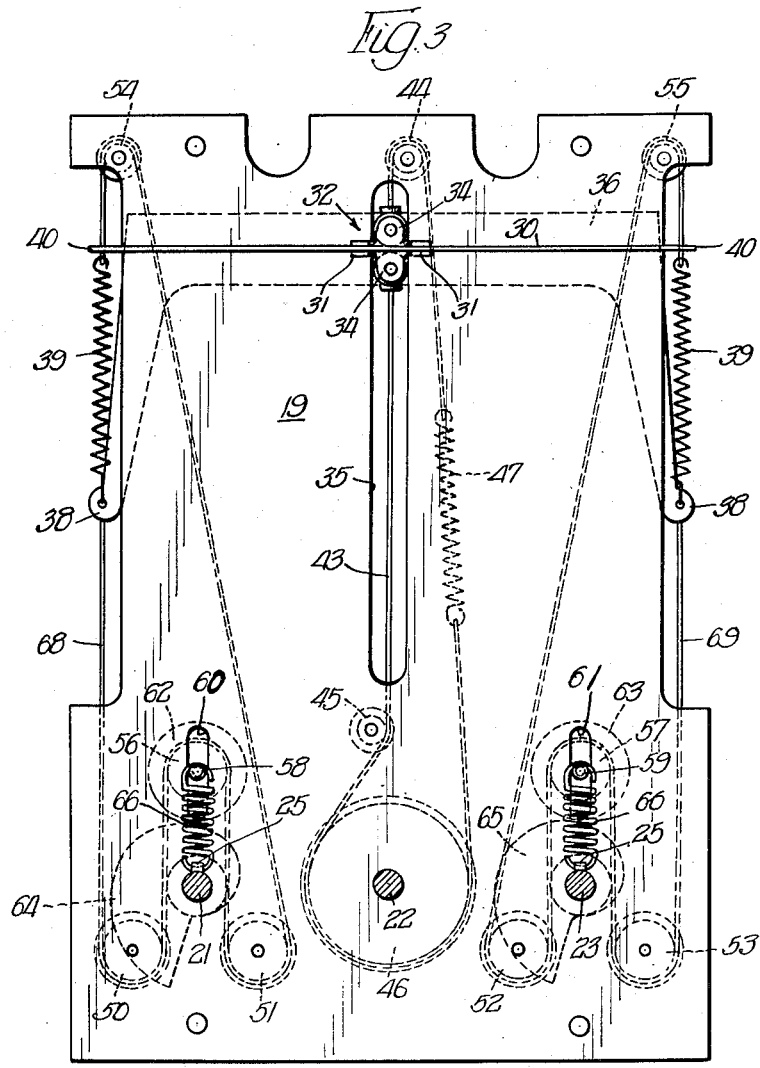

Feb. 19, 1957 F. P. BENNETT 2,781,736
INDICATING MEANS
Filed June 7, 1955. 3 Sheets-Sheet 3
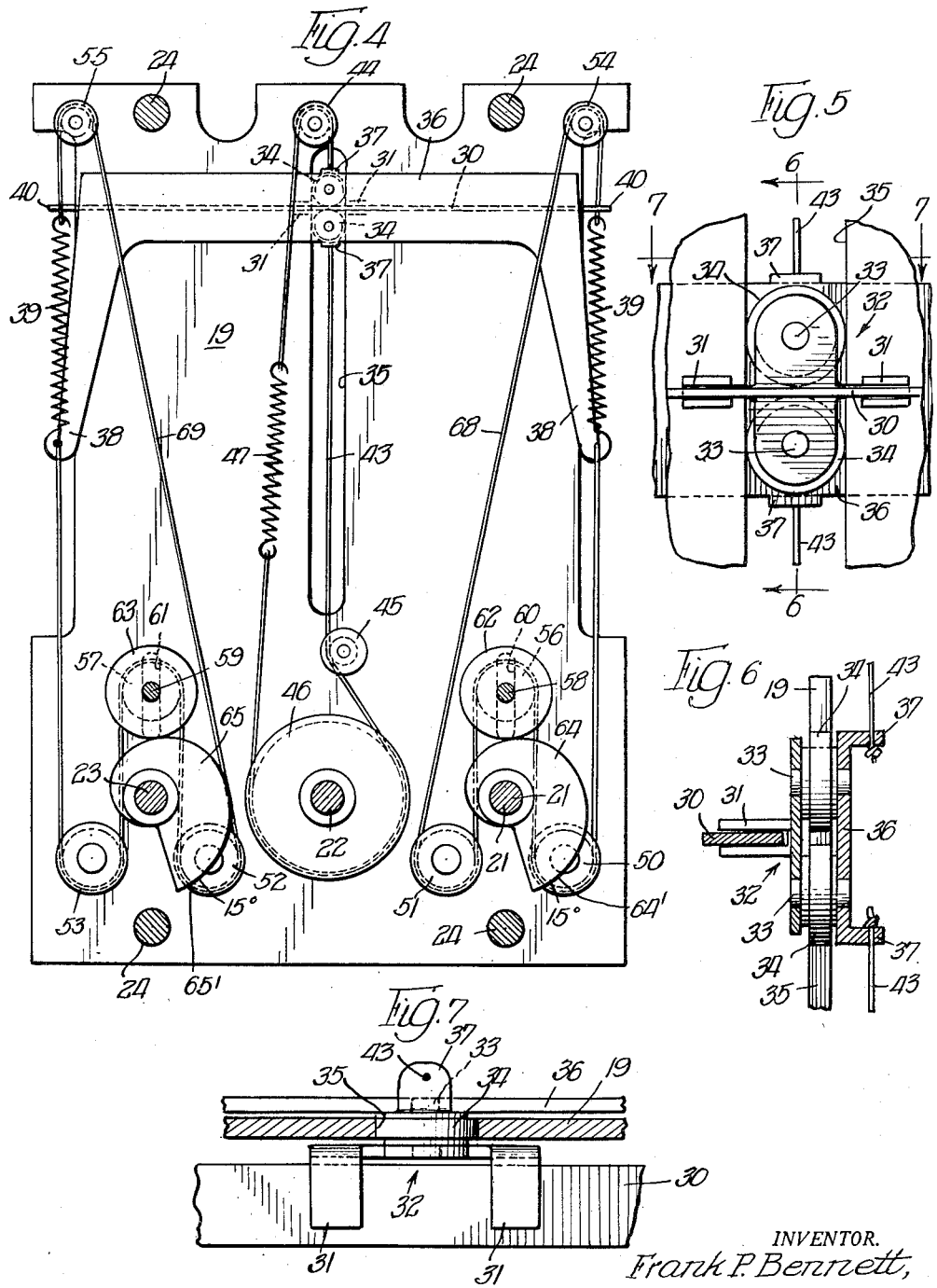
INVENTOR.
Frank P. Bennett,
BY
Robert R. Lockwood
Atty.

United States Patent Office 2,781,736
Patented Feb. 19, 1957

2,781,736

INDICATING MEANS

Frank P. Bennett, Chicago, Ill., assignor to Bell & Howell Company, Chicago, Ill., a corporation of Illinois Application June 7, 1955, Serial No. 513,705

15 Claims. (Cl. 116—124.1)

This invention relates, generally, to indicating means and it has particular relation to tone control indicating means for use especially in conjunction with high fidelity audio amplification although its use is not so limited.

Among the objects of this invention are: To provide for indicating the positions of the bass and treble controls of an audio amplifier for any level or volume to which the amplifier may be adjusted; to change the level or volume of the amplifier without changing the relative settings of the bass and treble indications; to employ a flexible indicator strip movable with respect to a chart bearing a tone control indicator grid with the strip being bodily movable as a function of the level or volume setting of the amplifier and the ends being movable as functions, respectively, of the bass and treble settings of the amplifier; to maintain the same relative positions of the ends of the strip for any level or volume setting; and to place the tone control indicator grid on a transparent sheet and employ a colored tone control indicator strip therebehind.

Other objects of this invention will, in part, be obvious and in part appear hereinafter.

This invention is disclosed in the embodiment thereof shown in the accompanying drawings and it comprises the features of construction, combination of elements and arrangement of parts which will be exemplified in the construction hereinafter set forth and the scope of the application of which will be indicated in the appended claims.

For a more complete understanding of the nature and scope of this invention reference can be had to the following detailed description, taken together with the accompanying drawings, in which:

Figure 3 is a vertical sectional view taken behind the panel and generally along the line 3—3 of Figure 2 and looking rearwardly;

Figure 4 is a vertical sectional view taken generally along the line 4—4 of Figure 2 and looking forwardly;

Figure 5 is an enlarged vertical plan view of the guiding means for the flexible tone control indicator strip at an enlarged scale, the view being an enlargement of the showing in Figure 3;

Figure 6 is a vertical sectional view taken generally along the line 6—6 of Figure 5; and Figure 7 is a horizontal sectional view taken generally along the line 7—7 of Figure 5.

Figure 1:
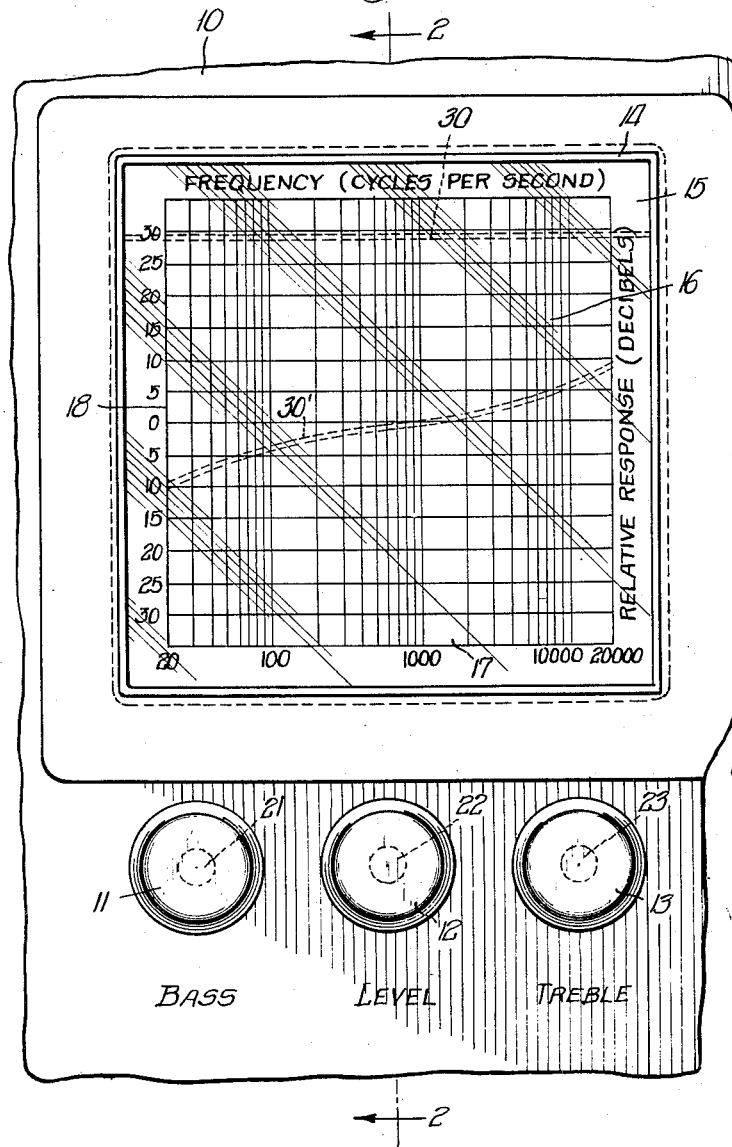
Figure 1 is a front plan view of a portion of a panel of an audio amplifier on which is mounted a chart bearing a tone control indicator grid together with the bass, level and treble control knobs for the amplifier, the panel being shown vertically but being capable of being positioned horizontally.

Referring now particularly to Figure 1 of the drawings, it will be observed that the reference character 10 designates a panel that may be formed on insulating material or metal and is placed in front of the audio amplifier of a radio receiver, tape recorder or the like. As indicated, the panel 10 can be positioned vertically, as shown, or it can be positioned horizontally if desired. Since the audio amplifier per se forms no part of this invention, the details thereof are not disclosed herein. In accordance with this invention the panel is provided with a bass control knob 11, a level or volume control knob 12 and a treble control knob 13 which are arranged to permit adjustment of the respective controls in the audio amplifier as will be understood readily.

Above these control knobs there is mounted a tone control cowling 14 in a rectangular opening in the panel 10. It carries a transparent sheet 15, preferably a transparent plastic, on the rear side of which a tone control grid 16 is etched. As indicated one axis 17 is calibrated in frequency on a logarithmic scale while the other axis 18 is calibrated in units of sound, i. e., decibels. It will be observed that the base control knob 11 is located underneath the low frequency portion of the axis 17 while the treble control knob 13 is located underneath the high frequency portion of the axis 17.

Figure 2:
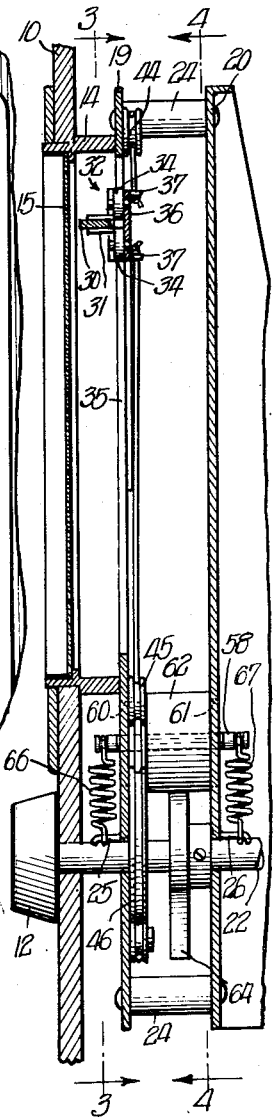
Figure 2 is a vertical sectional view taken generally along the line 2—2 of Figure 1.

Positioned behind the panel 10 and parallel therewith are a front plate 19 and a back plate 20. Rotatably mounted on and extending through the plates 19 and 20 are a bass control shaft 21, a level or volume control shaft 22 and a treble control shaft 23. It will be understood that these shafts operate the respective control portion of the audio amplifier and that the respective control knobs 11, 12 and 13 are fast on their forward ends. Spacers 24 serve to hold the front and back plates 19 and 20 in spaced relation. Lugs 25 and 26, Figures 2 and 3, are struck up from the front and back plates 19 and 20 where the bass and treble control shafts 21 and 23 project therethrough. The function of these lugs will be set forth hereinafter.

Movably mounted behind the transparent sheet 15 bearing the tone control grid 16 is a flexible tone control indicator strip 30. Preferably the strip 30 is formed of a flexible plastic material and is colored, i. e., is colored red, so that it is readily visible through the transparent sheet 15. As will appear hereinafter provision is made for bodily moving the strip 30 up and down with respect to the vertically disposed sheet 15 and the tone control grid 16 thereon. In addition, provision is made for independently moving the ends of the strip 30 in accordance with the adjustment of the bass and treble controls for the audio amplifier. A typical position of the strip 30 is indicated at 30' by broken lines in Figure 1. With the strip adjusted as indicated at 30' it is movable bodily on rotation of the level control knob 12 up or down depending upon the direction of rotation.

As shown more clearly in Figures 3, 5, 6 and 7 of the drawings the flexible strip 30 is carried by U-shaped supports 31 which project forwardly from a support fitting that is shown, generally, at 32. A pair of studs 33 project rearwardly from the body portion of the support fitting 32 and guide rollers 34 are mounted thereon to be guided by the walls of a central slot 35 in the front plate 19. It will be observed that the rear portions of the studs 33 project into the central portion of an indicator support yoke 36 which is provided with rearwardly projecting ears 37 the function of which will be set forth presently. The indicator support yoke 36 extends across the back of the front plate 19 and is movable vertically with respect thereto by means to be described hereinafter. The ends of the support yoke 36 have integrally formed downwardly extending arms 38 and coil tension springs 39 are provided for interconnecting the ends 40 of the strip 30 with the lowermost portions of the arms 38. The springs 39 serve to effect conjoint movement of the ends 40 of the strip 30 with the indicator support yoke 36 when the latter is moved bodily in response to rotation of the level control knob 12.

With a view to moving bodily the flexible tone control indicator strip 30 an inextensible flexible member 43, such as a wire or cord, is connected at its ends to the rearwardly projecting ears 37, Figures 4 and 6, and is trained over an upper idler pulley 44 and a lower idler pulley 45 and over a level control pulley 46 that is fast on the level control shaft 22. A coil tension spring 47 is interposed in the flexible member 43 in order to keep it taut and in non-slipping engagement with the level control pulley 46. It will be observed that the portion of the flexible member 43 between the upper and lower idler pulleys 44 and 45 is centrally located with respect to the vertical axis of the slot 35. This is accomplished by placing the pulleys 44 and 45 in offset relationship with respect to the slot 35 at its ends with the inner sides of the pulleys 44 and 45 in contact with the flexible member 43 being in alignment with the vertical axis of the slot 35.

When the level control shaft 22 is rotated by rotation of the level control knob 12 in either direction the indicator support yoke 36 is moved upwardly or downwardly relative to the front plate 19. It is guided in this movement by the rollers 34 cooperating with the sides of the central slot 35. The ends 40 of the strip 30 move conjointly with the support yoke 36. It remains to describe how the ends 40 are moved independently in accordance with the rotation of the bass and treble control knobs 11 and 13.

As shown more clearly in Figure 4 a pair of idler pulleys 50 and 51 is provided on the back of the front plate 19 below and on opposite sides of the bass control shaft 21. Likewise a pair of idler pulleys 52 and 53 is provided below the treble control shaft 23 on opposite sides thereof. Near the upper edge of the front plate 19 on its back side top idler pulleys 54 and 55 are rotatably mounted. Cam follower pulleys 56 and 57 are rotatably mounted on cam shafts 58 and 59 which extend through pairs of registering vertical slots 60 and 61 in the front and back plates 19 and 20. Also mounted on the cam follower shafts 58 and 59 are cam followers 62 and 63 which are generally cylindrical and are arranged to engage boost cams 64 and 65 which are fast on the bass and treble control shafts 21 and 23 respectively. Preferably the boost cams 64 and 65 are arranged to have a rise of .028 inch for each 15° through 300° and to have a dwell portion at 64' and 65', respectively, which extends through about 15°, this portion being circular with respect to the respective axis of rotation of the cams 64 and 65. In order to maintain the cam followers 62 and 63 in contact engagement with the boost cams 64 and 65, coil tension springs 66 and 67 are employed. As shown more clearly in Figures 2 and 3 of the drawings these coil tension springs are interconnected between the ends of the cam follower shafts 58 and 59 and the lugs 25 and 26 therebelow.

Inextensible flexible members, either wire or cord, 68 and 69 are provided for interconnecting the ends 40 of the flexible tone control indicator strip 30 and the downwardly extending arms 38 of the indicator support yoke 36. As shown more clearly in Figure 4 the flexible members 68 and 69 are trained over the respective top idler pulleys 54 and 55, the inner idler pulleys 51 and 52, the cam follower pulleys 56 and 57 and the idler pulleys 50 and 53. It will be understood that the cam follower pulleys 56 and 57 are rotatable relative to the cam followers 62 and 63.

It will be observed that the outermost portions of the top idler pulleys 54 and 55 and the outermost portions of the idler pulleys 50 and 53 which are in engagement with the inextensible flexible members 68 and 69 are in alignment and in alignment with the ends 40 of the flexible tone control indicator strip 30 and the lower end portions of the downwardly extending arms 38.

It will now be understood that the rotation of the bass and treble control knobs 11 and 13 effects corresponding movement of the inextensible flexible members 68 and 69 and corresponding deflection of the respective ends 40 of the flexible tone control indicator strip 30. Thus, as shown at 30' in Figure 1 and described hereinbefore, these ends can be individually adjusted depending upon the adjustment of the bass and treble control knobs 11 and 13 to indicate the corresponding setting for the audio amplifier. Now, as the level or volume of the amplifier is changed by rotation of the level control knob 12, the indicator strip 30 is moved bodily upwardly or downwardly depending upon the direction of rotation of the level control knob 12.

While the inextensible flexible members 43, 68 and 69 have been described as being formed of wire or cord, it will be understood that they can be formed of chain links and that the respective pulleys would be sprockets suitably rotatably mounted.

Since certain further changes can be made in the foregoing construction and different embodiments can be made without departing from the spirit and scope thereof, it is intended that all matter shown in the accompanying drawings and described hereinbefore shall be interpreted as illustrative and not in a limiting sense.

What is claimed as new is:

1. Tone control indicating means for use with an audio amplifier having bass, level and treble control means comprising, in combination, a chart bearing a rectangular tone control indicating grid, a flexible tone control indicator strip movably mounted with respect to said chart, means connected to the ends of said flexible strip for shifting the same individually with respect to said chart as a function of the settings respectively of said bass and treble control means, and means connected to said flexible strip for bodily shifting the same with respect to said chart as a function of the setting of said level control means without changing the relative positions of the ends thereof adjusted as aforesaid.

2. Tone control indicating means for use with an audio amplifier having bass, level and treble control means comprising, in combination, a transparent chart bearing a tone control indicator grid calibrated along one axis in units of frequency and along the other axis in units of sound, a colored flexible tone control indicator strip movably mounted behind said transparent chart, means connected to the ends of said flexible strip for shifting the same individually with respect to said chart as a function of the settings respectively of said bass and treble control means, and means connected to said flexible strip for bodily shifting the same with respect to said chart as a function of the setting of said level control means without changing the relative positions of the ends thereof adjusted as aforesaid.

3. Tone control indicating means for use with an audio amplifier having bass, level and treble control means comprising, in combination, a chart bearing a rectangular tone control indicating grid, a flexible tone control indicator strip movably mounted with respect to said chart, means connected to the ends of said flexible strip for shifting the same individually with respect to said chart as a function of the settings respectively of said bass and treble control means, and means connected to the central portion of said flexible strip for bodily shifting the same with respect to said chart as a function of the setting of said level control means without changing the relative positions of the ends thereof adjusted as aforesaid.

4. Tone control indicating means for use with an audio amplifier having bass, level and treble control means comprising, in combination, a chart bearing a rectangular tone control indicating grid, a flexible tone control indicator strip movably mounted with respect to said chart, means for bodily shifting the position of said flexible strip with respect to said chart as a function of the setting of said level control means, and means for shifting the ends of said flexible strip with respect to said chart individually as a function respectively of the settings of said bass and treble control means, said means for shifting said ends of said strip being characterized by maintaining the same relative positions of said ends to which they are adjusted for any position of said strip to which it may be adjusted by said means for bodily shifting said strip.

5. Tone control indicating means for us with an audio amplifier having bass, level and treble control means comprising, in combination, a transparent chart bearing a tone control indicator grid calibrated along one axis in units of frequency and along the other axis in units of sound, a colored flexible tone control indicator strip movably mounted behind said transparent chart, means for bodily shifting the position of said flexible strip with respect to said chart as a function of the setting of said level control means, and means for shifting the ends of said flexible strip with respect to said chart individually as a function respectively of the settings of said bass and treble control means, said means for shifting said ends of said strip being characterized by maintaining the same relative positions of said ends to which they are adjusted for any position of said strip to which it may be adjusted by said means for bodily shifting said strip.

6. Tone control indicating means for use with an audio amplifier having bass, level and treble control means comprising, in combination, a chart bearing a rectangular tone control indicating grid, a flexible tone control indicator strip movably mounted with respect to said chart, operating means connected to the central portion of said flexible strip for bodily shifting the position thereof with respect to said chart as a function of the setting of said level control means, spring means interconnecting the ends of said flexible strip and said operating means, and operating means connected to the ends of said flexible strip for shifting the same with respect to said chart individually as a function respectively of the settings of said bass and treble control means.

7. Tone control indicating means for use with an audio amplifier having bass, level and treble control means comprising, in combination, a transparent chart bearing a tone control indicator grid calibrated along one axis in units of frequency and along the other axis in units of sound, a colored flexible tone control indicator strip movably mounted behind said transparent chart, operating means connected to the central portion of said flexible strip for bodily shifting the position thereof with respect to said chart as a function of the setting of said level control means, spring means interconnecting the ends of said flexible strip and said operating means, and operating means connected to the ends of said flexible strip for shifting the same with respect to said chart individually as a function respectively of the settings of said bass and treble control means.

8. Tone control indicating means for use with an audio amplifier having bass, level and treble control means comprising, in combination, front and rear plates in parallel spaced relation with a central vertically extending slot in the former; bass, level and treble control shafts in parallel horizontal spaced relation in the order named projecting through and rockably mounted on said plates and each carrying a control knob at one end in front of said front plate with a boost cam fast on each bass and treble control shaft and a control pulley on said level control shaft between said plates; a pair of bodily vertically movable horizontally disposed laterally spaced cam follower shafts extending between said plates, a cam follower and a pulley on each cam follower shaft with the pulleys juxtaposed to said front plate, a pair of idler pulleys rotatably mounted on the back of said front plate below and on opposite sides of said bass and treble control shafts, a pair of top idler pulleys rotatably mounted on the upper part of the back of said front plate, upper and lower idler pulleys rotatably mounted on the back of said front plate at the ends of said central vertical slot therein, an indicator support yoke juxtaposed to the back of and extending horizontally across said front plate, guide means mounted on the central portion of said yoke and in said central vertical slot in said front plate and guided thereby, a support fitting carried by said yoke with said guide means therebetween and disposed on the front side of said front plate, a flexible tone control indicator strip horizontally carried by said support fitting, a vertically disposed chart coextensive with the range of movement of said tone control indicator strip and bearing a tone control indicator grid calibrated horizontally in units of frequency and vertically in units of sound, a spring interconnecting each outer end of said tone control indicator strip and the respective outer end of said support yoke; an inextensible flexible member interconnecting each said outer end of said tone control indicator strip and said respective outer end of said support yoke and trained over the respective top idler pulley, the inner of each pair of idler pulleys, the cam follower pulley, and the outer of each pair of idler pulleys; and an inextensible flexible member with the ends connected to said yoke and trained over said upper idler pulley, said control pulley and said lower idler pulley; rotation of said bass and treble control shafts by their respective control knobs vertically shifting the respective ends of said control indicator strip and rotation of said level control shaft by its control knob bodily vertically shifting said tone control indicator strip without changing the relative positions of the ends thereof as adjusted by said bass and treble control knobs.

9. Tone control indicating means for use with an audio amplifier having bass, level and treble control means comprising, in combination, front and rear plates in parallel spaced relation with a central vertically extending slot in the former; bass, level and treble control shafts in parallel horizontal spaced relation in the order named projecting through and rockably mounted on said plates and each carrying a control knob at one end in front of said front plate with a boost cam fast on each bass and treble control shaft and a control pulley on said level control shaft between said plates; a pair of bodily vertically movable horizontally disposed laterally spaced cam follower shafts extending between said plates, a cam follower and a pulley on each cam follower shaft between said plates with the pulleys juxtaposed to said front plate, a pair of idler pulleys rotatably mounted on the back of said front plate below and on opposite sides of said bass and treble control shafts, a pair of top idler pulleys rotatably mounted on the upper part of the back of said front plate, upper and lower idler pulleys rotatably mounted on the back of said front plate at the ends of said central vertical slot therein, an indicator support yoke juxtaposed to the back of and extending horizontally across said front plate, guide means mounted on the central portion of said yoke and in said central vertical slot in said front plate and guided thereby, a support fitting carried by said yoke with said guide means therebetween and disposed on the front side of said front plate, a flexible colored tone control indicator strip carried by said support fitting, a transparent vertically disposed rectangular sheet stationarily mounted in front of said tone control indicator strip and bearing a tone control indicator grid calibrated horizontally in units of frequency and vertically in units of sound, a spring interconnecting each outer end of said tone control indicator strip and the respective outer end of said support yoke; an inextensible flexible member interconnecting each said outer end of said tone control indicator strip and said respective outer end of said support yoke and trained over the respective top idler pulley, the inner of each pair of idler pulleys, the cam follower pulley, and the outer of each pair of idler pulleys; and an inextensible flexible member with the ends connected to said yoke and trained over said upper idler pulley, said control pulley and said lower idler pulley; rotation of said bass and treble control shafts by their respective control knobs vertically shifting the respective ends of said tone control indicator strip and rotation of said level control shaft by its control knob bodily vertically shifting said tone control indicator strip without changing the relative positions of the ends thereof as adjusted by said bass and treble control knobs.

10. Tone control indicating means for use with an audio amplifier having bass, level and treble control means comprising, in combination, front and rear plates in parallel spaced relation with a central vertically extending slot in the former; bass, level and treble control shafts in parallel horizontal spaced relation in the order named projecting through and rockably mounted on said plates and each carrying a control knob at one end in front of said front plate with a boost cam fast on each bass and treble control shaft and a control pulley on said level control shaft between said plates; a pair of bodily vertically movable horizontally disposed laterally spaced cam follower shafts extending between said plates, a cam follower and a pulley on each cam follower shaft with the pulleys juxtaposed to said front plate, spring means biasing each cam follower into engagement with the respective cam, a pair of idler pulleys rotatably mounted on the back of said front plate below and on opposite sides of said bass and treble control shafts, a pair of top idler pulleys rotatably mounted on the upper part of the back of said front plate, upper and lower idler pulleys rotatably mounted on the back of said front plate at the ends of said central vertical slot therein, an indicator support yoke juxtaposed to the back of said front plate having depending arms at the ends and a pair of centrally located rearwardly extending ears, guide means mounted on the central portion of said yoke and in said central vertical slot in said front plate and guided thereby, a support fitting carried by said yoke with said guide means therebetween and disposed on the front side of said plate, a flexible tone control indicator strip horizontally carried by said support fitting, a vertically disposed chart coextensive with the range of movement of said tone control indicator strip and bearing a tone control indicator grid calibrated horizontally in units of frequency and vertically in units of sound, a coil tension spring interconnected each outer end of said tone control indicator strip and the lower end of the respective depending arm of said support yoke; an inextensible flexible member interconnecting each said outer end of said tone control indicator strip and said lower end of the respective depending arm of said support yoke and trained over the respective top idler pulley, the inner of each pair of idler pulleys, the cam follower pulley, and the outer of each pair of idler pulleys; and an inextensible flexible member interconnecting said ears on said yoke and trained over said upper idler pulley, said control pulley and said lower idler pulley; rotation of said bass and treble control shafts by their respective control knobs vertically shifting the respective ends of said control indicator strip and rotation of said level control shaft by its control knob bodily vertically shifting said control indicator strip without changing the relative positions of the ends thereof as adjusted by said bass and treble control knobs.

11. Tone control indicating means for use with an audio amplifier having bass, level and treble control means comprising, in combination, front and rear plates in parallel spaced relation with a central vertically extending slot in the former; bass, level and treble control shafts in parallel horizontal spaced relation in the order named projecting through and rockably mounted on said plates and each carrying a control knob at one end in front of said front plate with a boost cam fast on each bass and treble control shaft and a control pulley on said level control shaft between said plates; a pair of bodily vertically movable horizontally disposed laterally spaced cam follower shafts extending between said plates, a cam follower and a relatively rotatable pulley on each cam follower shaft with the pulleys juxtaposed to said front plate, a pair of idler pulleys rotatably mounted on the back of said front plate below and on opposite sides of said bass and treble control shafts, a pair of top idler pulleys rotatably mounted on the upper part of the back of said front plate with their outermost portions of the outer of each of said pairs of idler pulleys, upper and lower idler pulleys rotatably mounted on the back of said front plate at the ends of said central vertical slot therein and on opposite sides of the center of said slot with the inner portions of these pulleys in vertical alignment, an indicator support yoke juxtaposed to the back of and extending horizontally across said front plate with the ends aligned respectively with said outermost portions of said top and pairs of idler pulleys, guide means mounted on the central portion of said yoke and in said central vertical slot in said front plate and guided thereby, a support fitting carried by said yoke with said guide means therebetween and disposed on the front side of said front plate, a flexible tone control indicator strip horizontally carried by said support fitting, a vertically disposed chart coextensive with the range of movement of said tone control indicator strip and bearing a tone control indicator grid calibrated horizontally in units of frequency and vertically in units of sound, a coil tension spring interconnecting each outer end of said tone control indicator strip and the respective outer end of said support yoke; an inextensible flexible member interconnecting each said outer end of said tone control indicator strip and said respective outer end of said support yoke and trained over the respective top idler pulley, the inner of each pair of idler pulleys, the cam follower pulley, and the outer of each pair of idler pulleys; and an inextensible flexible member with the ends connected to said yoke and trained over said upper idler pulley, said control pulley and said lower idler pulley; rotation of said bass and treble control shafts by their respective control knobs vertically shifting the respective ends of said tone control indicator strip and rotation of said level control shaft by its control knob bodily vertically shifting said tone control indicator strip without changing the relative positions of the ends thereof as adjusted by said base and treble control knobs.

12. Tone control indicating means for use with an audio amplifier having bass, level and treble control means comprising, in combination, front and rear plates in parallel spaced relation with a central vertically extending slot in the former and two pairs of registering vertically extending slots therein below and spaced from opposite sides of said central slot; bass, level and treble control shafts in parallel horizontal spaced relation in the order named projecting through and rockably mounted on said plates and each carrying a control knob at one end in front of said front plate with a boost cam fast on each bass and treble control shaft and a control pulley on said level control shaft between said plates; a cam follower shaft extending through each pair of slots, a cam follower and a relatively rotatable pulley on each cam follower shaft between said plates with the pulleys juxtaposed to said front plate, a pair of idler pulleys rotatably mounted on the back of said front plate below and on opposite sides of said bass and treble control shafts, a pair of top idler pulleys rotatably mounted on the upper part of the back of said front plate, upper and lower idler pulleys rotatably mounted on the back of said front plate at the ends of said central vertical slot therein, an indicator support yoke juxtaposed to the back of and extending horizontally across said front plate, a pair of guide rollers one above the other rotatably mounted on the central portion of said yoke and in said central vertical slot in said front plate and guided thereby, a support fitting carried by said yoke with said guide rollers therebetween and disposed on the front side of said front plate, a flexible tone control indicator strip carried by said support fitting, a transparent vertically disposed rectangular sheet stationarily mounted in front of said tone control indicator strip and bearing a tone control indicator grid calibrated horizontally in units of frequency and vertically in units of sound, a coil tension spring interconnecting each outer end of said tone control indicator strip and the respective outer end of said support yoke; an inextensible flexible member interconnecting each said outer end of control indicator strip and said respective outer end of said support yoke and trained over the respective top idler pulley, the inner of each pair of idler pulleys, the cam follower pulley, and the outer of each pair of idler pulleys; and an inextensible flexible member with the ends connected to said yoke and trained over said upper idler pulley, said control pulley and said lower idler pulley; rotation of said bass and treble control shafts by their respective control knobs vertically shifting the respective ends of said tone control indicator strip and rotation of said level control shaft by its control knob bodily vertically shifting said tone control indicator strip without changing the relative positions of the ends thereof as adjusted by said bass and treble control knobs.

13. Tone control indicating means for use with an audio amplifier having bass, level and treble control means comprising, in combination, front and rear plates in parallel spaced relation with a central vertically extending slot in the former and two pairs of registering vertically extending slots therein below and spaced from opposite sides of said central slot; bass, level and treble control shafts in parallel horizontal spaced relation in the order named projecting through and rockably mounted on said plates and each carrying a control knob at one end in front of said front plate with a boost cam fast on each bass and treble control shaft and a control pulley on said level control shaft between said plates; a cam follower shaft extending through each pair of slots, a cam follower and a relatively rotatable pulley on each cam follower shaft between said plates with the pulleys juxtaposed to said front plate, spring means biasing each cam follower into engagement with the respective cam, a pair of idler pulleys rotatably mounted on the back of said front plate below and on opposite sides of said bass and treble control shafts, a pair of top idler pulleys rotatably mounted on the upper part of the back of said front plate with their outermost portions in vertical alignment with the outermost portions of the outer of each of said pairs of idler pulleys, upper and lower idler pulleys rotatably mounted on the back of said front plate at the ends of said central vertical slot therein and on opposite sides of the center of said slot with the inner portions of these pulleys in vertical alignment, an indicator support yoke juxtaposed to the back of said front plate having depending arms at the ends aligned respectively with said outermost portions of said top and pairs of idler pulleys, a pair of guide rollers one above the other rotatably mounted on the central portion of said yoke and in said central vertical slot in said front plate and guided thereby, a support fitting carried by said yoke with said guide rollers therebetween and disposed on the front side of said front plate, a flexible colored tone control indicator strip carried by said support fitting, a transparent vertically disposed rectangular sheet stationarily mounted in front of said tone control indicator strip and bearing a tone control indicator grid calibrated horizontally in units of frequency and vertically in units of sound, a coil tension spring interconnecting each outer end of said tone control indicator strip and the lower end of the respective depending arm of said support yoke; an inextensible flexible member interconnecting each said outer end of said tone control indicator strip and said lower end of the respective depending arm of said support yoke and trained over the respective top idler pulley, the inner of each pair of idler pulleys, the cam follower pulley, and the outer of each pair of idler pulleys; and an inextensible flexible member with the ends connected to said yoke and trained over said upper idler pulley, said control pulley and said lower idler pulley; rotation of said bass and treble control shafts by their respective control knobs vertically shifting the respective ends of said tone control indicator strip and rotation of said level control shaft by its control knob bodily vertically shifting said control indicator strip without changing the relative positions of the ends thereof as adjusted by said bass and treble control knobs.

14. Tone control indicating means for use with an audio amplifier having bass, level and treble control means comprising, in combination, front and rear plates in parallel spaced relation with a central vertically extending slot in the former and two pairs of registering vertically extending slots therein below and spaced from opposite sides of said central slot; bass, level and treble control shafts in parallel horizontal spaced relation in the order named projecting through and rockably mounted on said plates and each carrying a control knob at one end in front of said front plate with a boost cam fast on each bass and treble control shaft and a control pulley on said level control shaft between said plates; a cam follower shaft extending through each pair of slots, a cam follower and a relatively rotatable pulley on each cam follower shaft between said plates with the pulleys juxtaposed to said front plate, spring means biasing each cam follower into engagement with the respective cam, a pair of idler pulleys rotatably mounted on the back of said front plate below and on opposite sides of said bass and treble control shafts, a pair of top idler pulleys rotatably mounted on the upper part of the back of said front plate with their outermost portions in vertical alignment with the outermost portions of the outer of each of said pairs of idler pulleys, upper and lower idler pulleys rotatably mounted on the back of said front plate at the ends of said central vertical slot therein and on opposite sides of the center of said slot with the inner portions of these pulleys in vertical alignment, an indicator support yoke juxtaposed to the back of said front plate having depending arms at the ends aligned respectively with said outermost portions of said top and pairs of idler pulleys, a pair of guide rollers one above the other rotatably mounted on the central portion of said yoke and in said central vertical slot in said front plate and guided thereby, a support fitting carried by said yoke with said guide rollers therebetween and disposed on the front side of said front plate, a flexible tone control indicator strip horizontally carried by said support fitting, a vertically disposed chart coextensive with the range of movement of said tone control indicator strip and bearing a tone control indicator grid calibrated horizontally in units of sound, a coil tension spring interconnecting each outer end of said tone control indicator strip and the lower end of the respective depending arm of said support yoke; an inextensible flexible member interconnecting each said outer end of said tone control indicator strip and said lower end of the respective depending arm of said support yoke and trained over the respective top idler pulley, the inner of each pair of idler pulleys, the cam follower pulley, and the outer of each pair of idler pulleys; and an inextensible flexible member with the ends connected to said yoke and trained over said upper idler pulley, said control pulley and said lower idler pulley; rotation of said bass and treble control shafts by their respective control knobs vertically shifting the respective ends of said tone control indicator strip and rotation of said level control shaft by its control knob bodily vertically shifting said tone control indicator strip without changing the relative positions of the ends thereof as adjusted by said bass and treble control knobs.

15. Tone control indicating means for use with an audio amplifier having bass, level and treble control means comprising, in combination, front and rear plates in parallel spaced relation with a central vertically extending slot in the former and two pairs of registering vertically extending slots therein below and spaced from opposite sides of said central slot; bass, level and treble control shafts in parallel horizontal spaced relation in the order named projecting through and rockably mounted on said plates and each carrying a control knob at one end in front of said front plate with a boost cam fast on each bass and treble control shaft and a control pulley on said level control shaft between said plates; a cam follower shaft extending through each pair of slots, a lug extending from each plate below each slot of each pair, a cam follower and a relatively rotatable pulley on each cam follower shaft between said plates with the pulleys juxtaposed to said front plate, a spring interconnecting each end of each cam follower shaft with the lug therebelow to bias each cam follower into engagement with the respective cam, a pair of idler pulleys rotatably mounted on the back of said front plate below and on opposite sides of said bass and treble control shafts, a pair of top idler pulleys rotatably mounted on the upper part of the back of said front plate with their outermost portions in vertical alignment with the outermost portions of the outer of each of said pairs of idler pulleys, upper and lower idler pulleys rotatably mounted on the back of said front plate at the ends of said central vertical slot therein and on opposite sides of the center of said slot with the inner portions of these pulleys in vertical alignment, an indicator support yoke juxtaposed to the back of said front plate having depending arms at the ends aligned respectively with said outermost portions of said top and pairs of idler pulleys and a pair of centrally located rearwardly extending ears, a pair of guide rollers one above the other rotatably mounted on the central portion of said yoke and in said central vertical slot in said front plate and guided thereby, a support fitting carried by said yoke with said guide rollers therebetween and disposed on the front side of said front plate and having a pair of generally U-shaped forwardly extending horizontally spaced supports, a flexible colored tone control indicator strip carried by said U-shaped supports, a transparent vertically disposed rectangular sheet stationarily mounted in front of said tone control indicator strip and bearing a tone control indicator grid calibrated horizontally in units of frequency and vertically in units of sound, a coil tension spring interconnecting each outer end of said tone control indicator strip and the lower end of the respective depending arm of said support yoke; an inextensible flexible member interconnecting each said outer end of said tone control indicator strip and said lower end of the respective depending arm of said support yoke and trained over the respective top idler pulley, the inner of each pair of idler pulleys, the cam follower pulley, and the outer of each pair of idler pulleys; and an inextensible flexible member having a coil tension spring interposed therein and interconnecting said ears on said yoke and trained over said upper idler pulley, said control pulley and said lower idler pulley; rotation of said bass and treble control shafts by their respective control knobs vertically shifting the respective ends of said tone control indicator strip and rotation of said level control shaft by its control knob bodily vertically shifting said tone control indicator strip without changing the relative positions of the ends thereof as adjusted by said bass and treble control knobs.

References Cited in the file of this patent

UNITED STATES PATENTS

| 2,298,987 | Thomsen | Oct. 13, 1942 |

FOREIGN PATENTS

| 907,447 | France | June 25, 1945 |